Figure 1:
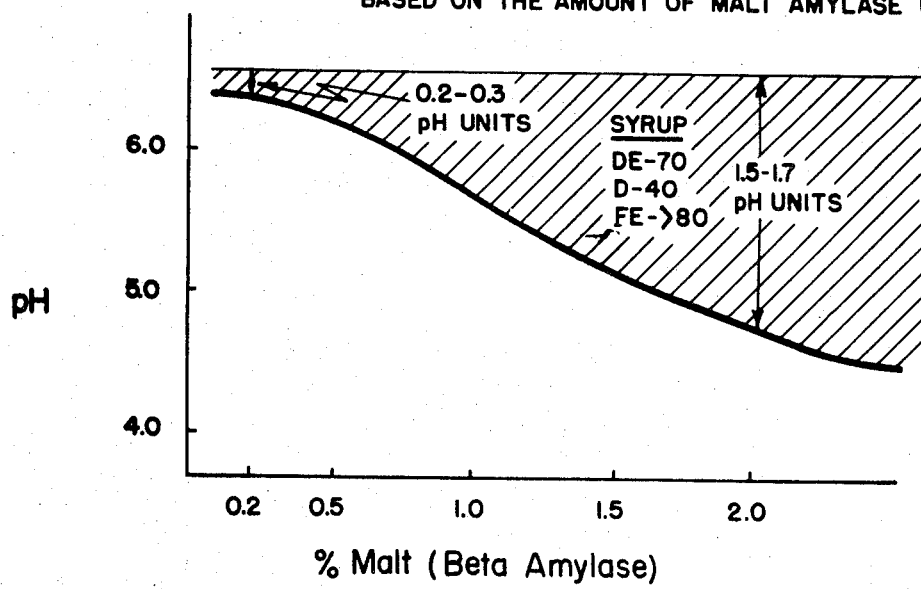

United States Patent

[11] 3,630,844

[72] Inventors Thomas L. Hurst;
Roy F. Larson; Almerin W. Turner, all of Decatur, Ill.
[21] Appl. No. 755,094
[22] Filed Aug. 26, 1968
[45] Patented Dec. 28, 1971
[73] Assignee A. E. Staley Manufacturing Company
Decatur, Ill.

[54] STARCH CONVERSION SYRUPS
16 Claims, 4 Drawing Figs.

[52] U.S. Cl............................................... 195/31
[51] Int. Cl............................................... C12b 1/00
[50] Field of Search................................... 195/31;
99/141, 142

[56] References Cited
UNITED STATES PATENTS
3,137,639 6/1964 Hurst et al.................. 195/31
3,535,123 10/1970 Heady......................... 195/31 X
OTHER REFERENCES
Lee et al. Arch Bioch and Biophysics 116, p. 162– 167, 1966.

Primary Examiner—A. Louis Monacell
Assistant Examiner—Gary M. Nath
Attorney—Charles J. Meyerson ABSTRACT: A method and composition for producing starch conversion syrups having a minimum F. E. value of 77 percent, a minimum D. E. value of about 68 percent and a maximum D. content of 47 percent by saccharifying a starch hydrolyzate with an enzyme composition comprising a diastase, glucoamylase and amylo-1,6-glucosidase.

OPERABLE pH RANGE FOR SACCHARIFYING STARCH
BASED ON THE AMOUNT OF MALT AMYLASE USED

% Malt (Beta Amylase)

OPERABLE pH RANGE FOR SACCHARIFYING STARCH
BASED ON THE AMOUNT OF MALT AMYLASE
IN COMBINATION WITH AMYLO-1,6-GLUCOSIDASE

% Malt (Beta Amylase) and
0.5 U. Amylo-1,6-Glucosidase

INVENTOR.
T.L. HURST
R.F. LARSON
A.W. TURNER

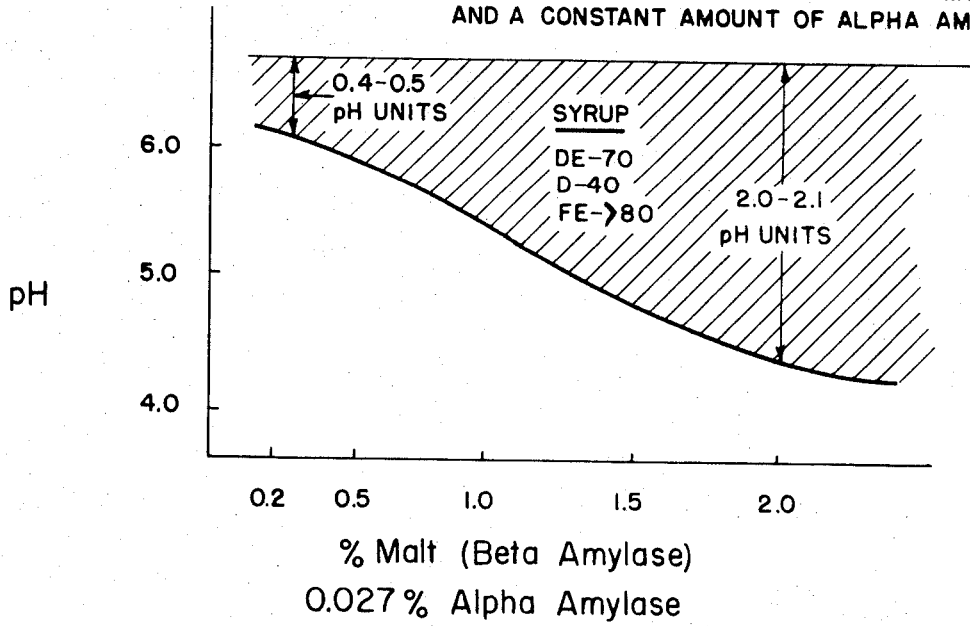

FIG. 3

OPERABLE pH RANGE FOR SACCARIFYING STARCH BASED ON VARIED AMOUNTS OF BETA AMYLASE AND A CONSTANT AMOUNT OF ALPHA AMYLASE.

% Malt (Beta Amylase)
0.027% Alpha Amylase

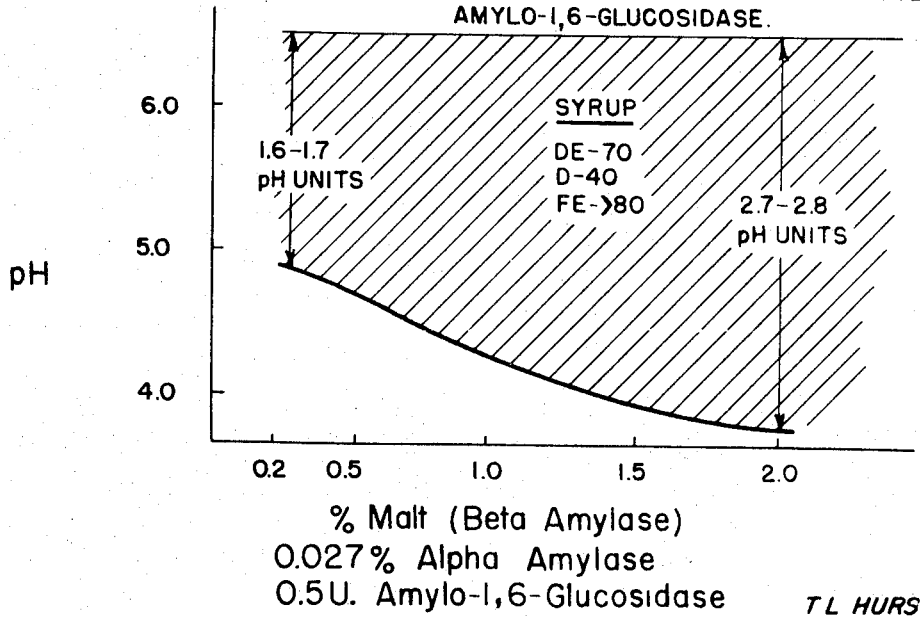

FIG. 4

OPERABLE pH RANGE FOR SACCARIFYING STARCH BASED ON VARIED AMOUNTS OF BETA AMYLASE AND CONSTANT AMOUNTS OF ALPHA AMYLASE AND AMYLO-1,6-GLUCOSIDASE.

% Malt (Beta Amylase)
0.027% Alpha Amylase
0.5 U. Amylo-1,6-Glucosidase

INVENTOR.
T L HURST
R F LARSON
A W TURNER

STARCH CONVERSION SYRUPS

DISCLOSURE OF INVENTION

This invention relates to an enzyme composition and to an improved method for producing starch conversion syrups having a high D.E. (dextrose equivalent), a high F.E. (fermentable extract) value and a limited D. (actual dextrose dry substance basis) content. More particularly, this invention is directed to an improved and more reliable method for consistently producing starch conversion syrups having a minimum F.E. value of 77 percent, a minimum D.E. value of 68 percent and a maximum D. content of 47 percent.

The broad, general technology for producing syrups from starch, often referred to as starch conversion syrups, is well known. Starch conversion syrups which are of particular commercial importance are the "corn syrups" or syrups produced from corn starch. More recently, though, there has been a particular demand for specialty type starch conversion syrups such as syrups having high F.E. and D.E. values and a critically controlled dextrose content. Such specialty type syrups are substantially different from the ordinary or general type of corn syrup.

The specialty type starch conversion syrups are especially well suited for certain industrial uses. For example, such syrups can be used as a "brewing adjunct" in the manufacture of beer. Another use is in the so-called "brew process" of making bread widely used by commercial bakeries. These syrups are important to the brewing and baking industries primarily because they contain a relatively high concentration (above 77 percent and preferably above 80 percent) of fermentable saccharides (principally dextrose and maltose), yet remain clear and fluid under normal storage conditions. Other uses for these specialty type starch conversion syrups are expected particularly when these syrups become available at lower cost.

From a taste standpoint it is most desirable that the dextrose content of the specialty type starch syrups be maintained at a high sweetness level. However, care must be taken to prevent the dextrose content from exceeding 47 percent D.S.B., otherwise excessive crystallization or "setting up" of the syrup will occur. Under adverse storage conditions, such as those which would be experienced during the fall and winter seasons, crystallization has been detected at concentrations of dextrose of between 41-45 percent D.S.B.

An ideal specialty type syrup therefore would be one which is high in fermentable saccharides yet has a dextrose concentration just below that concentration which would cause crystallization. Such a specialty syrup would be, for example, one having a D. content of about 40 percent, a D.E. value of about 70 percent and a F.E. value of greater than 80 percent.

The following U.S. patents are representative of the prior art dealing with the production of specialty type corn syrups as distinguished from ordinary glucose or C.S.U. (corn syrup unmixed) made by straight acid conversion: Dale and Langlois U.S. Pat. No. 2,201,609, dated May 21, 1940; Campbell and Mason U.S. Pat. No. 2,822,303, dated Feb. 4, 1958; Langlois U.S. Pat. No. 2,891,869, dated June 23, 1969; and Hurst and Turner U.S. Pat. No. 3,137,639, dated June 16, 1964. Although all of the above patents disclose a particular method for making syrups by starting with a thinned starch, e.g. acid thinned starch, and then completing the starch conversion process with enzymes, U.S. Pat. No. 3,137,639 is of particular significance. This patent discloses a method for producing a specialty type corn syrup having a D.E. of 68-75 percent, a F.E. minimum of 77 percent and a D. maximum of 47 percent by using a combination of enzymes comprising beta-amylase and refined amyloglucosidase.

As is indicated in U.S. Pat. No. 3,137,639, there were several problems which had to be overcome before a syrup having a high F.E. value, a high D.E. value and a dextrose content below that which would cause crystallization of the syrup could be obtained. One of the problems specifically referred to was in selectively suppressing the production of dextrose during saccharification without unduly interfering with the production of other fermentable saccharides. Another problem which was encountered was in controlling or reducing the amount of impurities or color bodies produced during saccharification and thus minimize the need for extensive refining or purification of the syrup. Since a high percentage of the contaminants present in the saccharified product came from the highly activated malt diastase, it was proposed that the contaminants in the syrup could be reduced by lowering the amount of malt amylase or malt diastase used during saccharification. This situation, however, proved to be unsatisfactory as the operable pH limits between which a high D.E. and F.E. syrup could be produced was likewise reduced. This made the consistent obtainment of a specialty type syrup difficult since any change in the saccharification system's pH generally resulted in a syrup having a composition different from that which was desired.

Accordingly, it is an object of this invention to provide a composition and method for producing special corn syrups which not only overcome the problems heretofore encountered but is also more efficient and economical than those now in existence.

Another object of this invention is to provide a composition and method for saccharifying corn starch wherein the resulting saccharified product possesses a high F.E. value, a high D.E. value, a D. content below that which would cause crystallization of the saccharified product and which is substantially lower in ash and protein content.

Another object of this invention is to provide a composition and method for producing corn syrups having a D.E. (dextrose equivalent) value in the range of 68-75 percent, a minimum F.E. (fermentable extract) value of 77 percent and a maximum D. (dextrose) content of about 47 percent.

Still another object of this invention is to provide a composition and method for producing syrups whereby the dextrose content can be controlled within a predetermined range with relative ease.

Other objects and advantages of this invention will be apparent from the disclosure and drawings wherein:

FIG. 1 graphically shows what effect a reduction in malt amylase has on the operable pH range for saccharifying starch.

Figure 2:
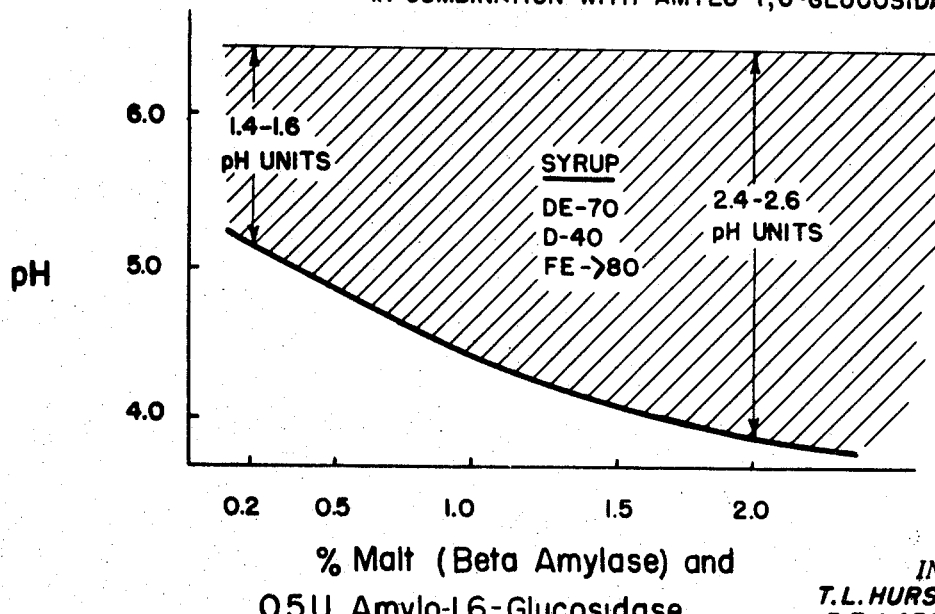

FIG. 2 graphically shows what effect the presence of amylo-1,6-glucosidase has on a saccharifying system in which the malt amylase has been reduced.

FIG. 3 graphically shows what effect a reduction in malt amylase has on the operable pH range for saccharifying starch in the presence of a constant amount of fungal alpha amylase.

FIG. 4 graphically shows what effect the presence of a constant amount of amylo-1,6-glucosidase and fungal alpha amylase has on a saccharifying system in which the malt amylase is being reduced.

The horizontal top line of the above Figures represents the pH (6.5-6.7) at which the production of dextrose by the action of glucoamylase is substantially reduced.

Through the disclosure and claims of this application certain abbreviations will be continually used. It is intended that these abbreviations have the following meaning.

"D.E." is the commonly used abbreviation for the so-called "dextrose equivalent" of a starch conversion syrup and constitutes a measurement of the content of reducing sugars (i.e., dextrose, maltose, higher sugars) and dextrins in the syrup expressed as dextrose.

"F.E." is the commonly used abbreviation for the so-called "fermentable extract" content of a starch conversion syrup. The fermentable extract is determined by the method of the Corn Industries Research Foundation (Method E-28 of "Standard Analytical Methods of the Member Companies of the Corn Industries Research Foundation," 1958). In this method, a sample of syrup is fermented under carefully controlled conditions with baker's yeast. The "fermentable extract" or "fermentables" is the difference between dry substance of the original sample and remaining dry substance after fermentation.

The designation "D." is the abbreviation for the dextrose content of a syrup (as distinguished from the content of other sugars and dextrin) and is given as the percent by weight of dextrose in a syrup D.S.B. (dry substance basis). Standardized procedures for determining D.E., F.E. and D. values are well known and described in various publications. If desired, an approximation of the maltose content of a syrup can be conveniently determined by subtracting the D. content from the F.E. value.

The process of the present invention is characterized generally by its efficiency, reliability, reproducibility in either small or large scale operations, its adaptability to either batch type or continuous type conversions and equipment, and the ease with which the enzyme conversion product may be refined and finished off into finished syrup. With the above in mind, special syrups can be conveniently prepared by the following steps and under the following conditions:

1. A slurry of starch is prepared by mixing granular starch with water to a Baume' of between 20°–25°.
2. The starch slurry is then thinned to a D.E. of preferably between 15–20, as by the use of an acid or an enzyme or by combinations thereof.
3. The thinned starch slurry is then adjusted, if necessary, to a pH of between 4.0 and 6.5, preferably, to a pH of between 4.5 5.9, and a solids content of between 20–55 percent.
4. The adjusted starch hydrolyzate is saccharified by adding an enzyme composition comprising a diastase or amylase such as alpha and/or beta-amylase, refined glucoamylase substantially free of transflucosidase and amylo-1,6-glucosidase and maintaining the hydrolyzate at a temperature of between 128°–132° F. for a period of time ranging from 24–100 hours or for a time sufficient to obtain a syrup having a D.E. of between 68–75 percent, a minimum F.E. of about 77 percent and a maximum D. content of about 47 percent.
5. After the desired syrup is obtained the enzymes are deactivated by heating the mixture to a temperature of between 165°–200° F.
6. Finally, the syrup is refined and concentrated to a Baume' of 40°–45° and a solids content of 78–85 percent.

Of the six steps above described, the most important is the saccharification step.

The saccharification step, that is the step wherein a thinned starch hydrolyzate is converted to a syrup having a particular composition, comprises contacting a starch hydrolyzate with an enzyme composition comprising (a) diastase (a diastatic enzyme capable of hydrolyzing starch to maltose and higher saccharides) such as beta and/or alpha amylase, (b) glucoamylase (an enzyme capable of hydrolyzing starch to dextrose) and (c) amylo-1,6-glucosidase (an enzyme capable of hydrolyzing the amylopectin fraction of starch at its 1-6 glucosidic linkages).

The enzyme diastase may be derived from a variety of sources, for example, plants, animals or micro-organisms, and may be either crude or refined. A convenient source of diastase, and particularly one having a high concentration of beta-amylase, is barley malt. Barley malt is available from a number of commercial sources under various proprietary names, e.g. Fromalt 72, enzymically highly active malted barley produced by Froedtert Malt Company, Milwaukee, Wisconsin. Other diastases such as fungal alpha-amylases may also be used. A typical fungal alpha-amylase preparation of commerce is Rohm & Haas' Rhozyme 33. Alpha amylases obtained from the organism *Aspergillus oryzae* or bacterial alpha-amylases, such as those found in Rohm & Haas' Rhozyme H-39, can also be used to advantage. A mixture or combination of amylases, for example, a mixture of malt and fungal amylases has been found to be particularly useful for producing syrups having high F.E. and D.E. values and a controlled D. content.

The amount of diastase required in combination with glucoamylase and amylo-1,6-glucosidase to saccarify starch or produce a syrup having high F.E. and D.E. values in a controlled D. content will vary depending on the source, purity, etc. of the enzyme. For the most part, though, if a diastase such as, for example, an alpha amylase is used, amounts as low as 0.001 percent, and preferably amounts of between 0.01 and 0.03 percent of the starch dry substance are used. When an enzymatically highly active malted barley is used as the source of the diastase, concentration of malt as low as 0.1 percent have been used, and it is possible that, under the proper conditions, even less can be used. Preferably, amounts of 0.1 to 0.5 or 1.0 percent are used. Although larger amounts, that is, amounts greater than 1.0 percent may be used, these larger concentrations are not required when amylo-1,6-glucosidase is present in the saccharifying system. This advantage is graphically demonstrated in FIG. 2. Furthermore, when malt is sued as the source of diastase, the amount should preferably be kept to a minimum and generally should not exceed 1.0 percent because of the malt's contribution to the production of color bodies and to other contaminants in the syrup.

As has been also previously stated, one of the advantages of this invention is that, when amylo-1,6-glucosidase is present in the enzyme composition, substantially smaller quantities of malt are required for saccharification. By using substantially lower quantities of malt, a syrup is produced having a much lower ash content and fewer color bodies. This enables the ion exchange resin, which is normally employed in the purification of starch conversion syrups, to be operated for longer periods of time without regeneration. Prior to this invention, it was extremely difficult to maintain commercial production of these specialty types starch syrups because, as the malt content was reduced, the operable pH range for saccharification was likewise reduced. As is shown in FIG. 1, the operable pH range for obtaining a syrup having a D.E. of about 70 percent, a D. content of about 40 percent and a F.E. value of greater than 80 percent was extremely narrow (0.2–0.3 pH units) when about 0.2 percent malt was employed in the saccharification system. However, as is further shown in FIG. 1, if the malt content is increased by a factor of about 10 or to about 2.0 percent, the operable pH range could be increased to about 1.5–1.7 units.

In FIG. 2, the operable pH range is shown to be substantially broadened by using, in addition to the malt, a small quantity of amylo-1,6-glucosidase (0.5 units). FIG. 2 shows that the operable pH range for 0.2 percent malt can be broadened from about 0.2 to about 1.5 units. This increases the difference in the possible pH variation by as much as 700 percent. The advantage, of course, in having available this broader operable pH range is that operators of a commercial syrup saccharaification unit are capable of obtaining consistently and with a high degree of reliability, syrups having the particular desired D.E., F.E. and D. values. Prior to this invention this consistency and reliability could be achieved by increasing the malt content, however, this also increased, as has been previously stated, the ash content and color bodies present in the syrup and thus increased purification costs.

FIG. 3 and 4 show that this operable pH range can be still further broadened by using a small amount of fungal alpha-amylase in combination with malt (beta)amylase.

The enzyme glucoamylase may be prepared as required or it may be purchased from one of several commercial sources. Thus, it may be produced according to the procedures described in Liggett et al. U.S. Pat. No. 2,881,115 and Langlois et al. U.S. Pat. No. 2,893,921. It has been discovered that such glucoamylase preparations will normally contain appreciable amounts of the enzyme transglucosylase (or transglucosidase) and that this must be substantially entirely removed before the glucoamylase can be used in producing high D.E.-F.E. syrups according to this invention. Of course, if the preparation is substantially free of transglucosylase no refining is necessary. If unrefined glucoamylase is used containing appreciable transglucosylase the dextrose (D.) content of the resulting syrup will exceed the 47 percent maximum specification at 67–75 percent D.E. and the F.E. values will be substantially below the 77 percent minimum.

There are several known procedures for refining glucoamylase so as to render it substantially free of the transglucosylase. Suitable refining procedures are described in U.S. Pat. Nos. 3,067,108 and 3,047,471 to Hurst et al. and in U.S. Pat. Nos. 2,967,804 and 2,970,086 to Kerr. With some glucoamylase preparations, e.g. Miles Laboratories' Diazyme L, as was previously pointed out, it is desirable to use in addition to a malt amylase a small proportion of a fungal alpha amylase, e.g. from 0.002 to 0.2 percent by weight of the starch undergoing conversion during saccharification. The use of the alpha amylase tends to limit and, thus, better control dextrose production. Additional information covering the effect which transglucosidase has on glucoamylase can be found in Cereal Chemistry, Vol. 43, pages 658–669, (1966).

From about 1 to 10 or more units (u.) of refined glucoamylase should be used per gram of starch solids, one unit of glucoamylase being that amount of the enzyme which will convert 100 milligrams of starch essentially to dextrose in 48 hours at 60° C. and pH 4.0. Excess amounts of glucoamylase are to be avoided in order to minimize the cost of refining to remove unwanted color bodies and other contaminants (e.g. protein) from the syrup.

The enzyme amylo-1,6-glucosidase, quite often referred to as "pullulanase," is an enzyme capable of selectively hydrolyzing alpha-1,6-glucosidic bonds of the amylopectin fraction of starch. Other enzymes capable of hydrolyzing alpha-1,6-glucosidic bonds are referred to in the literature as "iso-amylase" and "R enzyme."

The preparation of an enzyme exhibiting amylo-1,6-glucosidase activity was reported by Bender & Wallenfels in *Biochemische Zeitschrift*, Vol. 334, pages 79–95 (1961). Other information covering the use and production of this enzyme can be found in *Methods of Enzymology*, Vol. 8, pages 555–559 (1966). According to the above references, amylo-1,6-glucosidase can be readily obtained from the organism *Aerobacter aerogenes*. Certain strains of the organism, *Aerobacter aerogenes*, have been reported to be particularly good sources for obtaining this enzyme. For example, *Aerobacter aerogenes* (U–58), which is reported to be a direct descendant of the original strain isolated by Bender & Wallenfels has been found to be a particularly good source of this enzyme. Various ultraviolet induced mutants of *Aerobacter aerogenes* (U–58) can also be used. Other reported strains of *Aerobacter aerogenes* which can be used include *Aerobacter aerogenes* ATCC 9621 and 15050.

Preparations of amylo-1,6-glucosidase or pullulanase can be obtained from the organism *Aerobacter aerogenes* by known cultivating methods. A suitable technique is described in the Bender and Wallenfels publication previously referred to. If desired, the crude preparation can be purified prior to use. However, the utility of the enzyme in the process of this invention is not restricted to preparations of any specific purity. Obviously, though, the use of an enzyme substantially free of contaminants would be advantageous.

The amount of amylo-1,6-glucosidase used is not particularly critical and depends to a large degree on the concentration of starch in the starch hydrolyzate, the activity of the enzyme, reaction conditions, etc. Generally, though, from about 0.05 to 1.25 units of amylo-1,6-glucosidase per gram of starch, and preferably between 0.20 and 0.70 units/g. of starch, are used. One unit of amylo-1,6-glucosidase is defined as that amount of enzyme present in 1.0 ml. of solution which, with excess pullulan as a substrate under standard conditions of assay, raises the reducing value within one hour at 45° C. to a 1 mg. of maltose.

The most efficient saccharification of the thinned starch hydrolyzate occurs when the starch hydrolyzate is thinned to a D.E. of less than 35 and has a solids content of less than 55 percent. During saccharification (in presence of enzymes) the starch hydrolyzate is maintained at a pH of between 3.5 and 7.0 and a temperature of between 25° and 60° C. Preferably the starch hydrolyzate is maintained at a pH of between 4.5 and 6.5 and a temperature of between 30° and 50 ° C. Under these conditions saccharification is normally complete after a period of between about 30 and 80 hours.

The following examples are merely illustrative embodiments of this invention and are not intended as specific limitations thereof.

Examples 1–10

To a 20°–22° (Be.) slurry of corn starch in water, 0.1 percent of HCl based on the dry substance weight of the starch was added with stirring. This proportion was obtained by mixing 1.16 lbs. of 20° Be. HCl with 100 gallons of a 21° Be. starch slurry. The resulting pH of the slurry was 2.2 pH. The slurry was converted to 15–19 D.E. using steam at 55 p.s.i.g. in a steam injection heater to raise the temperature to 302° F. which was maintained for 3–5 minutes. After discharge to atmospheric pressure, the hot batch was neutralized to 4.5 to 5.0 pH by the addition of a solution of soda ash. This required approximately 0.15 percent D.S. of soda ash based on the D.S. weight of the syrup solids. A soda ash solution containing 1.25 lbs. of soda ash per gallon is satisfactory. After neutralization, the batch was cooled to 128–132 ° F. before further processing.

The D.S. value of the cooled hydrolyzate liquor was determined, and predetermined amounts, as reported in Table I, of highly active malted barley (Wallerstein's malt amylase), glucoamylase, and amylo-1,6-glucosidase were added thereto. The glucoamylase preparation (Rohm & Haas' Diastase 73) was diluted with water to about 100 u./ml. and refined with 0.2 percent w./v. of lignin at pH 4 as described in U.S. Pat. No. 3,047,471. This refining treatment serves to remove fungal spores, color and transglucosidase. The amylo-1,6-glucosidase was added as an aqueous solution. The amylo-1,6-glucosidase was derived from the organism *Aerobacter aerogenes* by the process reported in *Biochemische Zeitschrift*, Vol. 334, pages 79–95 (1961). The malt was added in dry powdered form. With the enzymes added, the starch slurry was converted at 128°–132° F. and at 5.6–5.9 pH for 48 hours. At the end of 48 hours, the enzyme conversion was arrested by sparging with steam sufficient to raise the temperature to 175° F. in 1 hour, which temperature was maintained for about 1 hour.

The syrup batch was then refined with resins and/or carbon and evaporated to a 43° Be. (82.5 percent D.S.). The syrups' D., D.E. and F.E. values for each of the enzyme combinations were determined and are reported in table I.

TABLE I

| Example | Malt, percent | Glucoamylase units/g. | Amylo-1,6-glucosidase units/g. | 48 hours | | | |
|---|---|---|---|---|---|---|---|
| | | | | Percent D.E. | Percent D | Percent F.E. | Percent D./D.E. |
| 1 | 2.0 | 2.6 | | 72.1 | 46.6 | 81.8 | .65 |
| 2 | 2.0 | 2.4 | | 68.9 | 42.1 | 79.1 | .62 |
| 3 | 1.0 | 2.8 | | 72.5 | 53.4 | | .74 |
| 4 | 0.5 | 3.0 | | 74.3 | 57.2 | | .77 |
| 5 | 0.25 | 3.0 | | 70.0 | 54.8 | | .78 |
| 6 | 0.25 | 2.5 | 0.5 | 70.0 | 43.0 | 78.2 | .61 |
| 7 | 0.5 | 1.5 | 0.25 | 68.2 | 42.1 | 81.9 | .62 |
| 8 | 0.5 | 2.0 | 0.50 | 69.7 | 44.6 | 79.5 | .64 |
| 9 | 0.5 | 3.0 | 1.0 | 69.3 | 37.7 | 86.4 | .54 |
| 10 | 1.0 | 2.8 | 0.5 | 71.3 | 43.2 | 83.8 | .61 |

It can be seen from the above examples that, in the absence of amylo-1,6-glucosidase, about 2.0 percent malt in combination with glucoamylase is required if a specialty type syrup having D.E. and F.E. values around 70 and 80 respectively and a D. content of about 40–45 is to be obtained. It can further be seen that as the malt content (beta-amylase) present during saccharification is reduced (examples 1–5) the dextrose content of the syrup increases. At a dextrose content of about 45–47 percent syrup crystallization or "setting up" generally occurs.

However, as is demonstrated by examples 6–10, the presence of amylo-1,6-glucosidase controls the production of dextrose even at lower malt concentrations. This is further demonstrated by the D./D.F. ratio also reported in table 1. A specialty type syrup having D./D.E. ratios of between 0.5 and 0.65 and F.E. values of about 80 percent is the type of syrup best suited for use in the brewing and baking industry.

Examples 11–20

These examples show the effect amylo-1,6-glucosidase has on the operable pH range for obtaining a starch corn syrup having a D.E. of at least 70 percent, a D. content of 40 percent and a F.E. value of at least 80 percent. The procedure of example I was followed except for the modifications reported in table II. The results are reported in table II below and graphically displayed in FIG. 1 and FIG. 2.

TABLE II

| Example | Malt, percent | Gluco-amylase units/g. | Amylo-1,6-glucosidase units/g. | Operable pH range for obtaining a syrup having a D.E. of 70%, D. of 40% and F.E. of 80% |
|---|---|---|---|---|
| 11 | 0.2 | 2.1–3.0 | | 6.4–6.5 |
| 12 | 0.2 | 2.1–3.0 | 0.5 | 5.4–6.5 |
| 13 | 0.5 | 2.1–3.0 | | 6.2–6.5 |
| 14 | 0.5 | 2.1–3.0 | 0.5 | 4.8–6.5 |
| 15 | 1.0 | 2.1–3.0 | | 5.6–6.5 |
| 16 | 1.0 | 2.1–3.0 | 0.5 | 4.4–6.5 |
| 17 | 1.5 | 2.1–3.0 | | 5.2–6.5 |
| 18 | 1.5 | 2.1–3.0 | 0.5 | 4.3–6.5 |
| 19 | 2.0 | 2.1–3.0 | | 5.0–6.5 |
| 20 | 2.0 | 2.1–3.0 | 0.5 | 4.2–6.5 |

Examples 21–25

The following examples show that all or part of the malt (beta-amylase) can be replaced with a fungal alpha-amylase. The examples were run according to the procedure described in example 1 with the exception of the modifications reported in table III below.

TABLE III

| | | Units/g. | | | 48 hours | | |
|---|---|---|---|---|---|---|---|
| Example | pH | Fungal (alpha) amylase | Gluco-amylase | Amylo-1,6-glucosidase | Percent D.E. | Percent D. | Percent F.E. |
| 21 | 5.9 | 0.15 | 2.4 | 0.5 | 74.4 | 46.9 | 83.6 |
| 22 | 5.9 | 0.31 | 2.4 | 0.5 | 73.8 | 45.8 | 83.4 |
| 23 | 6.1 | 0.15 | 2.4 | 0.5 | 71.1 | 41.6 | 82.5 |
| 24 | 6.1 | 0.31 | 2.4 | 0.5 | 70.8 | 39.9 | 82.5 |
| 25 | 6.2 | *.05 | 2.5 | 1.4 | 70.6 | 31.4 | 95.0 |

*1% malt was also added.

Since many embodiments of this invention may be made and since many changes may be made in the embodiments described, the foregoing is interpreted as illustrative and the invention is defined by the claims appended hereafter.

We claim:

1. A process for saccharifying a thinned starch hydrolyzate comprising contacting said starch hydrolyzate with a combination of enzymes comprising diastase, glucoamylase and amylo-1,6-glucosidase under conditions and for a period of time sufficient to provide a starch conversion syrup having a minimum dextrose equivalent value of about 68 percent, a minimum fermentable extract value of about 77 percent and a maximum dextrose content of about 47 percent.

2. The process of claim 1 wherein the diastase is primarily a beta-amylase.

3. The process of claim 2 wherein the beta-amylase is obtained from barley malt.

4. The process of claim 3 wherein the glucoamylase is substantially free of transglucosidase.

5. The process of claim 1 wherein the diastase is primarily a fungal alpha amylase.

6. The process of claim 4 wherein the starch conversion syrup has a dextrose equivalent value in the range of about 68–75 percent.

7. The process of claim 6 wherein the starch conversion syrup has a dextrose equivalent value of at least 70 percent, a minimum fermentable extract value of about 80 percent and a maximum dextrose content of between about 41–45 percent.

8. The process of claim 7 wherein the starch hydrolyzate liquor has a D.E. of between about 15 to 20, a pH of between about 4.0 and 6.5, a solids content of about 20 to 55 percent starch by weight of the starch on a dry substance basis and wherein the digestion of the starch hydrolyzate is for approximately 24–100 hours at a temperature below that which will deactivate the saccharifying enzymes.

9. The process of claim 8 wherein at least about 0.1 percent by weight dry substance basis of highly activated malt amylase, about 1.5 units of glucoamylase per gram of starch solids and at least 0.1 units of amylo-1,6-glucosidase per gram of starch solids are used in saccharifying said thinned starch hydrolyzate liquor.

10. The process of claim 9 wherein the starch hydrolyzate liquor is acid thinned.

11. The process of claim 10 wherein the malt amylase is substituted in whole or in part by an equivalent amount of a fungal alpha amylase.

12. The process of claim 11 wherein the fungal alpha amylase is substituted in whole or in part by a bacterial alpha amylase.

13. The process of claim 1 wherein the amylo-1,6-glucosidase is obtained from the organism *Aerobacter aerogenes*.

14. An enzyme composition comprising a mixture of diastase, glucoamylase and amylo-1,6-glucosidase said mixture being characterized by its ability to saccharify starch to a syrup having a dextrose equivalent value of about 68 percent, a minimum fermentable extract of about 77 percent and a maximum dextrose content of about 47 percent.

15. The composition of claim 14 wherein the diastase is an enzyme selected from the group consisting of alpha or beta amylase or mixtures thereof.

16. A composition of claim 15 wherein the alpha amylase is a fungal alpha amylase and the beta amylase is obtained from barley malt.

* * * * *

UNITED STATES PATENT OFFICE
CERTIFICATE OF CORRECTION

Patent No. 3,630,844                    Dated December 28, 1971

Inventor(s) Thomas L. Hurst; Roy F. Larson; Almerin W. Turner

It is certified that error appears in the above-identified patent and that said Letters Patent are hereby corrected as shown below:

Column 3, lines 11 & 12 for "of 68 percent" read ---of about 68%---
Column 3, line 25 for "4.5 5.9" read ---4.5 and 5.9---
Column 3, line 30 for "transflucosidase" read ---transglucosidase---
Column 3, lines 74 & 75 for "saccarify starch or produce" read ---saccharify starch to produce---
Column 4, line 8 for "concentration" read ---concentrations---
Column 4, line 16 for "is sued" read ---is used---
Column 4, line 49 for "saccharaification" read ---saccharification---
Column 5, line 47 for "and 15050" read ---and ATCC 15050---
Column 6, lines 5 & 6 for "45°C to a 1 mg." read ---45°C. to a value which is equivalent to one mg.---
Column 6, line 24 for "20-22° (Be.)" read ---20-22° Baumé (Bé.)---
Column 7, line 15 for "D./D.F." read ---D./D.E.---
Column 7, line 68, Claim 1, for "A precess" read ---A Process---

Signed and sealed this 20th day of June 1972.

(SEAL)
Attest:

EDWARD M. FLETCHER, JR.                 ROBERT GOTTSCHALK
Attesting Officer                       Commissioner of Patents